United States Patent
Omuta et al.

(10) Patent No.: US 7,069,738 B2
(45) Date of Patent: Jul. 4, 2006

(54) COOLING TANK

(75) Inventors: Mamoru Omuta, Hyogo (JP); Osamu Tabuchi, Hyogo (JP); Jung Chun Li, Hyogo (JP)

(73) Assignee: Rokko Engineering Co., LTD, Hyogo (JP)

( * ) Notice: Subject to any disclaimer, the term of this patent is extended or adjusted under 35 U.S.C. 154(b) by 0 days.

(21) Appl. No.: 10/475,337

(22) PCT Filed: Apr. 24, 2002

(86) PCT No.: PCT/JP02/04059

§ 371 (c)(1),
(2), (4) Date: Oct. 17, 2003

(87) PCT Pub. No.: WO02/087315

PCT Pub. Date: Nov. 7, 2002

(65) Prior Publication Data

US 2004/0112079 A1    Jun. 17, 2004

(30) Foreign Application Priority Data

Apr. 26, 2001  (JP) .............................. 2001-129750

(51) Int. Cl.
*F25D 17/02* (2006.01)
(52) U.S. Cl. ........................... 62/434; 62/435; 165/108
(58) Field of Classification Search ................. 62/435, 62/434; 165/108, 143; 426/16
See application file for complete search history.

(56) References Cited

U.S. PATENT DOCUMENTS

| | | | |
|---|---|---|---|
| 4,011,736 A * | 3/1977 | Harrison ....................... | 62/260 |
| 4,206,237 A * | 6/1980 | Sakata et al. ................. | 426/16 |
| 5,666,817 A * | 9/1997 | Schulak et al. ............... | 62/185 |
| 6,640,579 B1 * | 11/2003 | Matsushima et al. ......... | 62/435 |

FOREIGN PATENT DOCUMENTS

| | | |
|---|---|---|
| JP | 7-8127 | 1/1995 |
| JP | 9-42818 | 2/1997 |
| JP | 10-170123 | 6/1998 |

OTHER PUBLICATIONS

Patent Abstracts of Japan, Publication No. 07-016152, Pub. Date: Jan. 20, 1995.
Patent Abstracts of Japan, Publication No. 07-327657, Pub. Date: Dec. 19, 1995.
Patent Abstracts of Japan, Tank Container Equipped With Cooling Device, 1998, Pub. Date 2001-225892.

* cited by examiner

*Primary Examiner*—Cheryl Tyler
*Assistant Examiner*—B. Clayton McCraw
(74) *Attorney, Agent, or Firm*—Friedrich Kueffner

(57) ABSTRACT

A tank is provided which can store, while cooling, drinks or other liquids, such as milk, having a storage temperature close to 0.degree. C. or below.

A cooling tank (1) can be mounted on a truck or the like for transportation, while storing and cooling milk. It is characterized in that brine (antifreeze solution) which has a freezing point below 0.degree. C. is cooled in a cooling unit (34) and allowed to pass, without stagnation, along fluid passages in flow guide members (14, 18) installed on the wall surface of the tank body (10). The cooling unit (34) preferably has an evaporator in a heat pump type refrigerator (30) for example, which uses a refrigerant for cooling the brine. Since the brine with a freezing point below 0.degree. C. is used, a large-sized water tank for cooling becomes unnecessary, and further since the brine will flow without stagnation, the liquid inside the tank body can be effectively cooled.

5 Claims, 5 Drawing Sheets

(a)

(b)

COOLING TANK

TECHNICAL FIELD

The present invention relates to a cooling tank for cooling and storage (and transportation, if necessary) of a liquid, especially milk or other drinks with a storage temperature close to 0.degree. C. or below.

BACKGROUND ART

A milk tank for storing milk is desired to have a cooling function in order to keep milk fresh. A milk tank with a cooling function is disclosed in the Japanese Patent Laid Open Gazette Hei. 7-8127 for example.

The milk tank described in the gazette comprises a tank body 10', a water tank (ice bank) 34' and a refrigerator 30', which are connected by a pipe 21' or the like as shown in FIG. 5. In other words, an evaporator 34a' which allows the refrigerant of the refrigerator 30' pass through is placed inside the water tank 34' where the cooling water is cooled to nearly 0.degree. C., and the cooling water is circulated through a cooling jacket 14' which is provided on the external peripheral surface of the tank body 10' by means of a pump 23'. The cooling jacket 14' has an outer wall spaced outwardly from the wall of the tank body 10' by 10 mm and a large number of alternately arranged dimples 14a' (projecting parts) which project inwardly from the outer wall to reach to the wall of the tank body 10'. The cooling water supplied from the water tank 34' through the feed pipe 21' flows windingly between the dimples 14a' in the above mentioned space in the cooling jacket 14' on the tank body 10' and runs back to the water tank 34' through the return pipe 22'.

The conventional milk tank represented by the example of FIG. 5 has room for improvement at the following points a), b):

a) A large-sized water tank, i.e., a container for cooling the water which is sent toward the tank body, should be needed. So it is hard to carry both a large-sized water tank, such as the water tank 34', and the tank body simultaneously, and actually it is difficult to compose a milk tank to be mounted on a truck or the like for transportation. The enlargement of the water tank is caused by the use of cooling water. In order to supply the cooling water of close to 0.degree. C. toward the tank body, the strong cooling must be done by the refrigerator so that ice may adhere to the outside of the evaporator in the water tank. The ice adhering to an evaporator will easily grow large, so the capacity of the water tank should be large enough to secure the quantity of the cooling water sent toward the tank body.

b) The cooling tank has low cooling efficiency and its capacity to cool milk or the contents of the tank body is tend to be insufficient. That is because the flow of the cooling water can hardly keep even velocity in the cooling jacket on the external peripheral surface of the tank body, and the stagnation often occurs in a wide area in the cooling jacket. The difficulty of forming even velocity flow of the cooling water is caused by that the cooling jacket has no guide member therein for the cooling water which flows from the feed pipe to the return pipe, therefore the flow of the cooling water is not regulated. That is, while the cooling water supplied to the cooling jacket from the feed pipe flows so much through areas with lower fluid resistance, it will hardly flow through areas with higher fluid resistance (areas where, for example, the flow takes a longer circuit or longer way). Although the cooling capacity can be improved by increasing the flux of the cooling water or lowering the temperature of the cooling water, the cooling efficiency may not be improved because there still exist the areas where the cooling water cannot flow smoothly in the cooling jacket, and inconveniently the much larger-sized water tank is required.

In addition, the subjects described above are not only about a milk tank but also common to a cooling tank which cools and stores a liquid with a low storage temperature (such as drinks).

DISCLOSURE OF THE INVENTION

The object of the present invention is to provide a cooling tank which has a small-sized cooling unit (equivalent to the above-mentioned water tank) and shows excellent cooling efficiency.

The present invention which is made to solve the above-mentioned subjects provides a cooling tank for storing and cooling a liquid, characterized in that brine with a freezing point below 0.degree. C. (that is, a solution used for indirect cooling instead of the cooling water of the above-mentioned example shown in FIG. 5) is cooled in a cooling unit and allowed to pass along a fluid passage which is defined on the (external/internal) wall of the tank body to prevent the brine from stagnating. As a liquid stored in the tank body, the drink, such as milk, with a storage temperature around 0.degree. C. is suitable. As a cooling unit, the one with the structure that the brine is cooled by means of an evaporator in a heat pump type refrigerator for example is used.

In such a cooling tank, a conventional large-sized water tank is not necessary and the efficiency to cool the contents is improved. The reason for the large-sized water tank being unnecessary is the use of the brine with a freezing point below 0.degree. C. instead of the above-mentioned cooling water to cool the tank body. The cooling unit to cool the brine is equivalent to the water tank in the conventional milk tank, where ice will not be produced even if the brine is cooled down to nearly 0.degree. C. because the freezing point of the brine is below 0.degree. C. As a result, it is not necessary to prepare the extra capacity for ice in the cooling unit and that makes it possible to downsize the cooling unit. The small-sized cooling unit can be combined with the tank body to form a transportable cooling tank.

The reason for the cooling efficiency of this cooling tank being improved is that the above-mentioned brine flows in the fluid passage which is formed on the wall of the tank body so as not to leave the area where the flow stagnates. With the brine flowing in such a manner, heat exchange between the liquid in the tank body and the brine is actively carried out in the area of the wall mentioned above, and the liquid inside can be cooled effectively.

In the cooling tank of the present invention, preferably the flow guide member is provided along with the wall of the tank body, the flow guide member defining a continuous space which leads in series and tightly disposed in a sheetlike form with partition plates between, and thereby said fluid passage is formed. The term "sheetlike form" means the shape of a plane or a curved surface. Since said continuous space is arranged in a sheetlike form with partition plates between, the flow guide member has considerable area.

According to such a cooling tank, the above-mentioned brine will flow along the wall of the tank body without leaving any stagnating area. It is because the installation of the above mentioned flow guide member on the wall of the tank body provides the fluid passage along the wall of the tank, which leads in series along the continuous space. When said fluid passage is equipped with an inlet for the brine at its one end and an outlet at the other, the brine will flow along the predetermined fluid passage which is guided and specified by the partition plates without stagnating. Therefore, the cooling in the tank body is performed strongly and efficiently. Since the continuous space for the passage of the brine in the flow guide member is not arranged in a straight line but tightly disposed in the sheetlike form with partition plates between, effective cooling can be performed in the large area of the tank body.

In the cooling tank, it is favorable to install a plurality of said flow guide members on the external surface of the wall of the tank body avoiding positions of reinforcement ribs and to connect two or more flow guide members together by a pipe.

In this cooling tank, the tank body can easily be composed by the following reasons. The first reason is that the flow guide members described above are provided along with the external surface of the wall of the tank body. The same cooling effect may be achieved even if the members are installed on the internal surface of the wall. However, it is not advantageous because welding or other work for installation must be done in a limited period before the tank forms a closed space or in a difficult situation of the inside of the completed tank body. On the contrary, the work to install the flow guide members on the external surface of the wall can be carried out comparatively easily at arbitrary time.

The second reason is that the positions of reinforcement ribs are avoided to install the flow guide members on the external surface of the wall of the tank body. If the flow guide members are installed in positions to lie across or cover reinforcement ribs, an additional work is required to prevent the above-mentioned continuous space from being divided by the ribs. That will disadvantageously make the structure of the flow guide members complicated and the work for attachment will also increase. If the positions of reinforcement ribs are avoided, however, the structure of the fluid guide members will become simple and the work for attachment will be very easy. In addition, the reason for being able to install the flow guide members so as to avoid the positions of reinforcement ribs is that each guide member is formed by arranging a continuous space in a sheetlike form with partition plates between as mentioned above and that its area and sizes (the length and width etc.) can be set up arbitrarily.

The third reason for easy composition of the tank body is that two or more flow guide members are connected together by pipes. It is also possible to connect the above-mentioned cooling unit in parallel with each guide member and to feed the brine into each guide member simultaneously without connecting the flow guide members together at all, but in that case the numbers and full length of pipes will increase, and the adjustment of the flow will be necessary because the difference of the passage resistance of each flow guide member tends to bring the stagnation of brine in some guide members. Therefore, the connection of two or more flow guide members (as many as possible) in series brings easy composition of the tank body.

Particularly, it is favorable to make the tank body of plates of stainless metal plate, such as stainless steel and aluminum alloy etc, and to cover the external surface of the wall of the tank body and the above-mentioned flow guide member with thermal insulating material, and to cover the external surface of the thermal insulating material with protection material, such as resin (FRP for example) or metal plates, which are not damaged easily by contacting with other things and is weatherproof.

Such a cooling tank has high keeping-cool effect on the contents and can serve for a long term. The high keeping-cool effect is the result of covering the wall of the tank body and the external surface of the above-mentioned flow guide member with thermal insulating material. The high durability is caused by covering the external surface of the thermal insulating material with protection material as well as by making the tank body of stainless metal plate. As a result, it is desirable as a cooling tank for storing the contents at low temperature with installed outdoors for example.

The cooling tank preferably has a cooling unit, the tank body (with the fluid passage of the brine formed on its wall), and means for passing the brine (a pump and piping equipment and the like), which are assembled integrally within a frame.

The cooling tank with such a structure is suitable for loading into transportation means, such as a ship, a track, and an airplane, being treated like a container to carry to a remote area. With assembled integrally, the cooling tank is easy to handle at loading to and unloading from transportation means and is convenient to be loaded densely on a carrier with stability. In addition, the reason that the cooling tank can be assembled into the structure suitable for loading or transportation is that, as described above, the cooling tank of the present invention can use a small-sized cooling unit.

BEST MODE FOR CARRYING OUT THE INVENTION

Referring to FIGS. 1–4, one preferred embodiment of the invention is hereafter described.

Figure 1:
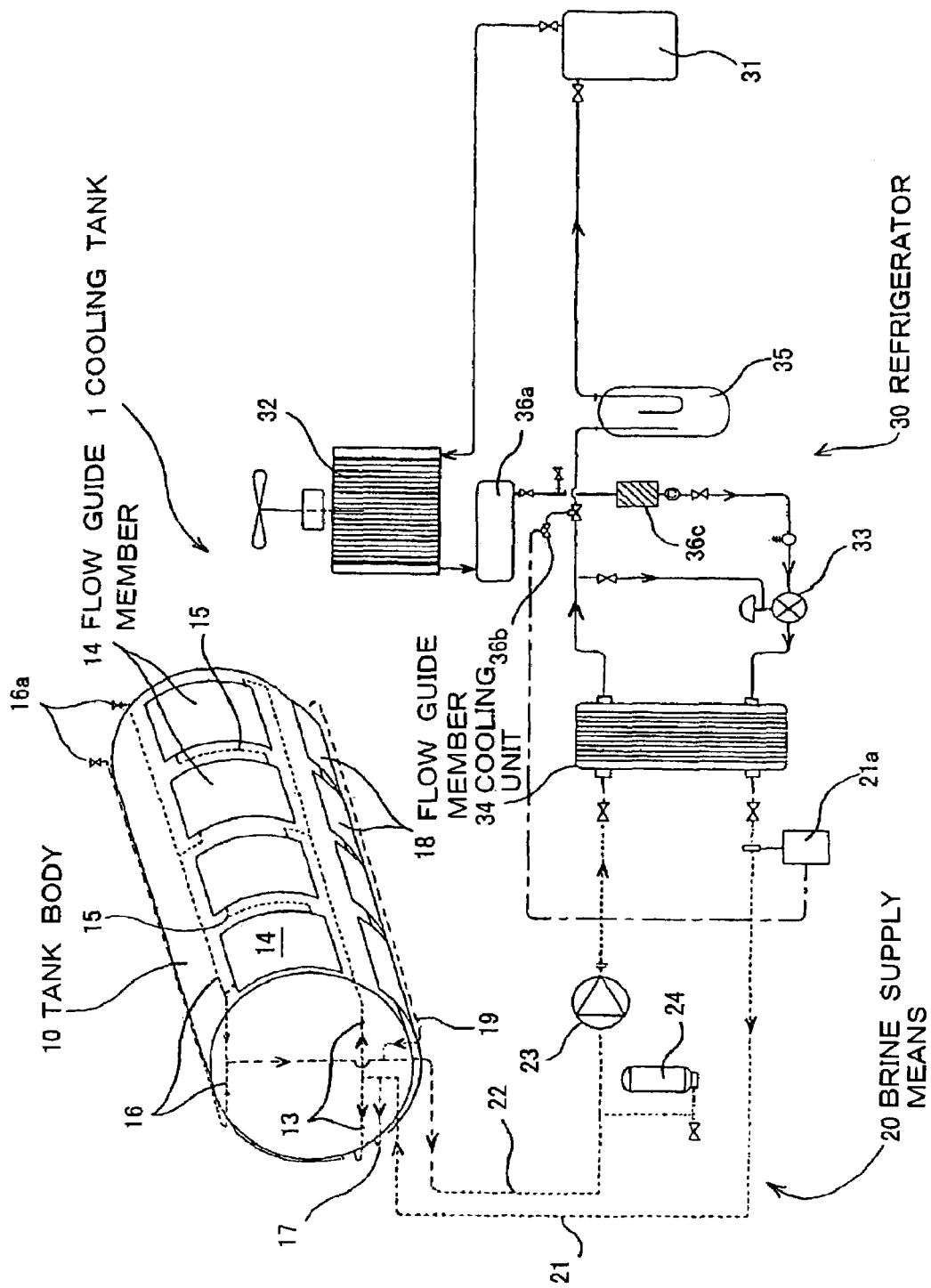
FIG. 1 is a system diagram of one embodiment of the present invention illustrating the connection of the cooling tank 1 which includes the tank body 10 and its attached equipment.

The cooling tank 1 shown in FIG. 1 is used for storing milk in the tank body 10 and maintaining the temperature of the milk around 0.degree. C. during transportation. The cooling tank 1 comprises the tank body 10 as a container of milk, the supply means 20 for the brine which cools the tank body 10 from the outside, and the refrigerator 30 for cooling the brine. The brine is cooled in a cooling unit (evaporator) 34 of the refrigerator 30 to about −1.degree. C. and cools the tank body 10 from its external surface. In addition, the tank body 10 must be equipped with basic compositions, such as an injection port and a take-out port for milk, and attached equipment for storage of milk.

The cooling tank 1 has the following features.

Figure 2:
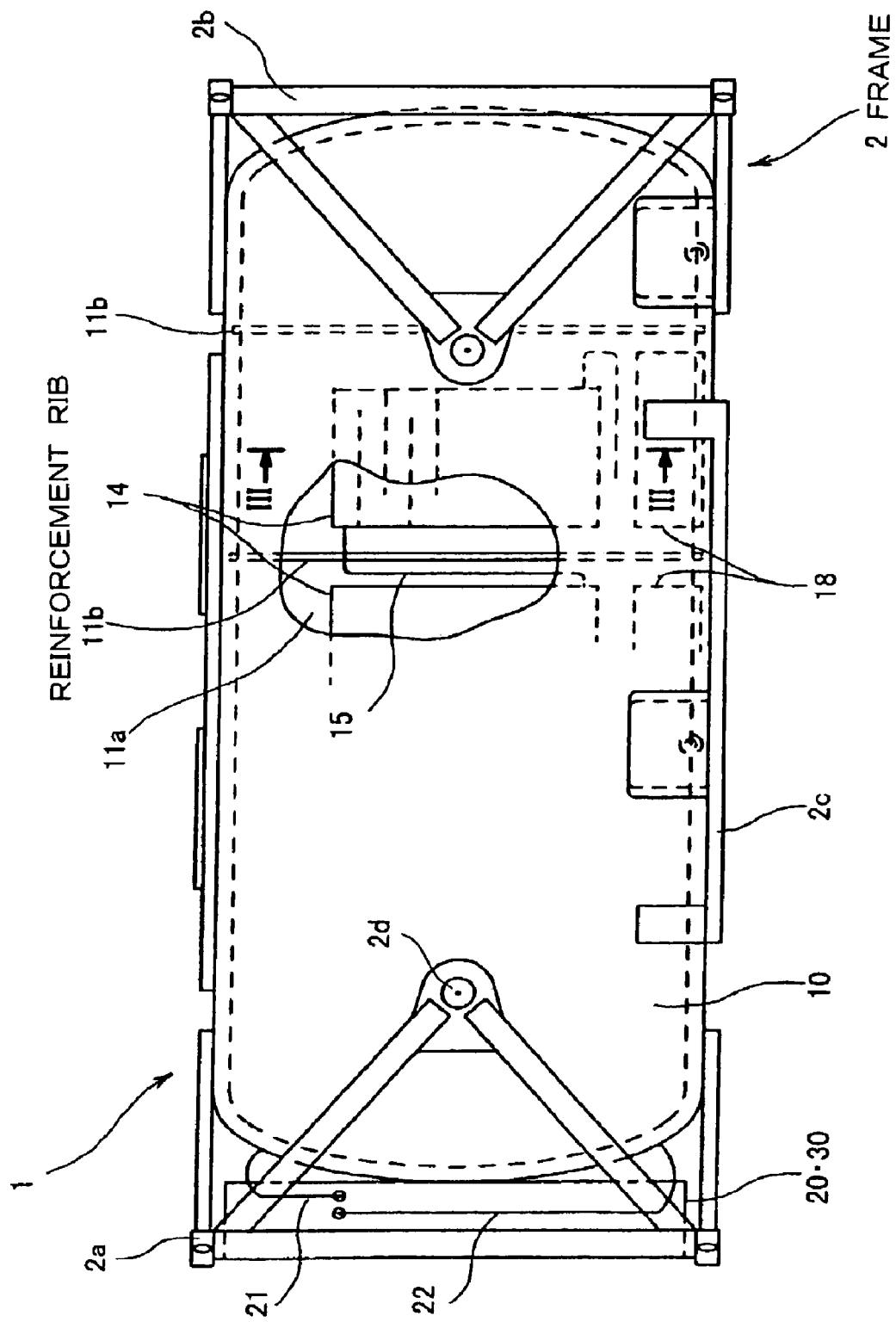
FIG. 2 is a side view showing the whole structure (appearance) of the cooling tank 1.

The first feature is that each component of the cooling tank 1 is assembled integrally into a frame 2, as shown in FIG. 2, so as to make it easy to load and carry on tracks and ships, etc. as a container. The frame 2 comprises the steel frames 2a, 2b, and 2c and the connecting bolts 2d. The tank body 10, the brine supply means 20 and the refrigerator 30 are arranged so as to be surrounded and fixed by them. The refrigerator 30, of a heat pump type using a refrigerant such as fluorocarbon R-22, comprises a compressor 31, a radiator (condensation machine) 32, an expansion valve 33, a cooling unit 34 and an accumulator 35 which are connected by piping as FIG. 1 and FIG. 4. The refrigerator 30 also has a receiver 36a, an evaporation pressure adjustment valve 36b and a drier 36c which are installed on the way of piping. By installing a brine circulation passage in the cooling unit 34 of the refrigerator 30 and exchanging heat between the refrigerant and the brine, the brine is cooled to about −1.degree. C. On the other hand, the brine supply means 20 comprises a feed pipe 21 and a return pipe 22 so that the brine may be circulated between the cooling unit 34 and the tank body 10, with a pump 23 and an expansion tank 24 installed on the way of the return pipe 22. The feed pipe 21 is provided with a sensor 21a for temperature control which is connected to the evaporation pressure adjustment valve 36b of the refrigerator 30 by a signal line. In addition, the expansion tank 24 keeps gas which changes its volume in proportion to the pressure of the brine so that it can absorb heat expansion (volume change) of the brine. With the expansion tank 24 connected on the way of the pipe, the brine supply means 20 is constituted in the sealed type piping system suitable for transportation, which is not equipped with a tank unsuitable for transportation such as an air opening type tank.

The compact structure of the cooling tank 1 which can be assembled integrally within the frame 2, as shown in FIG. 2, is achieved by the use of the antifreeze solution, a mixture of 50% water and 50% propylene glycol, as the above-mentioned brine for cooling the tank body 10. Since the antifreeze solution, having a freezing temperature (a freezing point) below 0.degree. C. (around −16.degree. C. in the example of the drawing), is used as the brine, the brine will not freeze (coagulate) in the cooling unit 34 as well as in the feed pipe 21 and the return pipe 22. The fact that the brine will not freeze brings the advantage that the brine is always supplied to the tank body 10 smoothly and there is no possibility of producing ice in the cooling unit 34. Since ice does not grow in the cooling unit 34, the compact cooling unit 34 with a small capacity can be employed while meeting the requirement of supplying the brine to the tank body 10 smoothly and continuously. Therefore, the whole cooling tank 1 can be structured to an extremely compact size. In addition, one more reason that the cooling tank 1 can be made compact is that the necessary flux of the brine is successfully reduced by installation of the following flow guide members 14, 18 on the tank body 10.

The second feature of the cooling tank 1 is that a plurality of flow guide members (Canaling System) 14, 18 are provided along with and attached to a plurality of positions in the external surface of the wall of the tank body 10, as shown in FIGS. 1 and 2, and a space for passing the above-mentioned brine is formed inside the flow guide members 14, 18. Four guide members 14 are attached to the right and left sides of the central portion of the tank body 10 respectively, and four guide members 18 are attached to the lower side of the tank body 10: the number of totals of the guide members is 12. As shown in FIG. 3(a), the tank body 10 is formed by a stainless steel wall 11a which is laminated by a thermal insulation material 1c made of urethane foam and a protection material lid made of hard FRP to this order on its external surface. Each flow guide member 14, 18 is formed in the shape of a curved board so that it may meet along the external surface of the wall 11a. Each guide member 14, 18 has the independent structure in the shape of a block and respectively (per piece) covers ⅟30–⅟100 of all the external surface area of the tank body 10.

Cooling of the contents (milk) of the tank body 10 is performed by passing a low-temperature brine into the above-mentioned space formed between the flow guide members 14, 18 and the wall 11a. Since the brine directly cools the surface of the wall 11a of the tank body 10 with no other components nor air layers between, effective cooling on the contents can be achieved. Moreover, inside the guide members 14, 18, there is not only the space to be filled with the brine but also a continuous space to regulate the fluid passage so as to pass the brine without stagnating, therefore, the brine flows quickly in any part of the space and the cooling is performed more strongly and efficiently. The following is the description about the structure and arrangement of the flow guide members 14, 18 with such functions.

Figure 3:
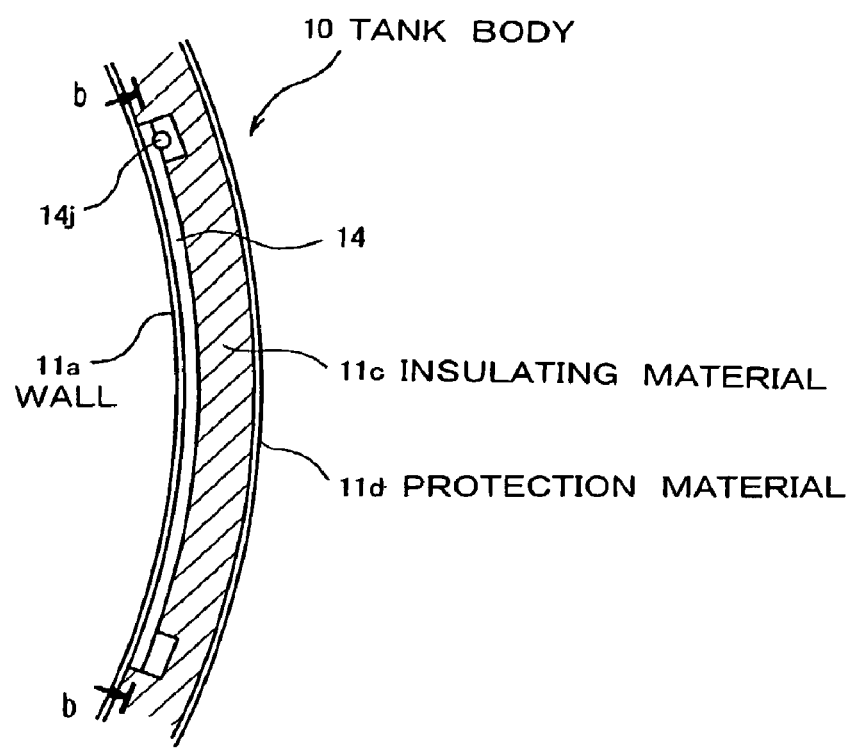
FIG. 3(*a*) is a partial section along III—III in FIG. 2, showing the section structure of the tank body 10, and FIG. 3(*b*) is a section along b—b in FIG. 3(*a*), showing the internal structure of the flow guide member 14 integrated with the tank body 10.
Figure 3:
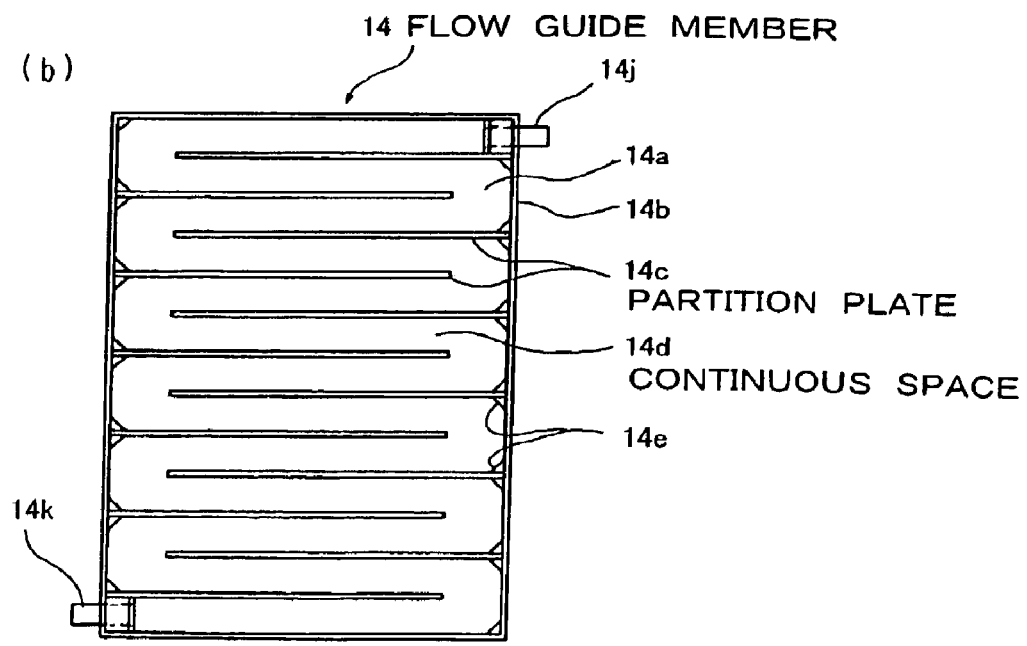
Figure 4:
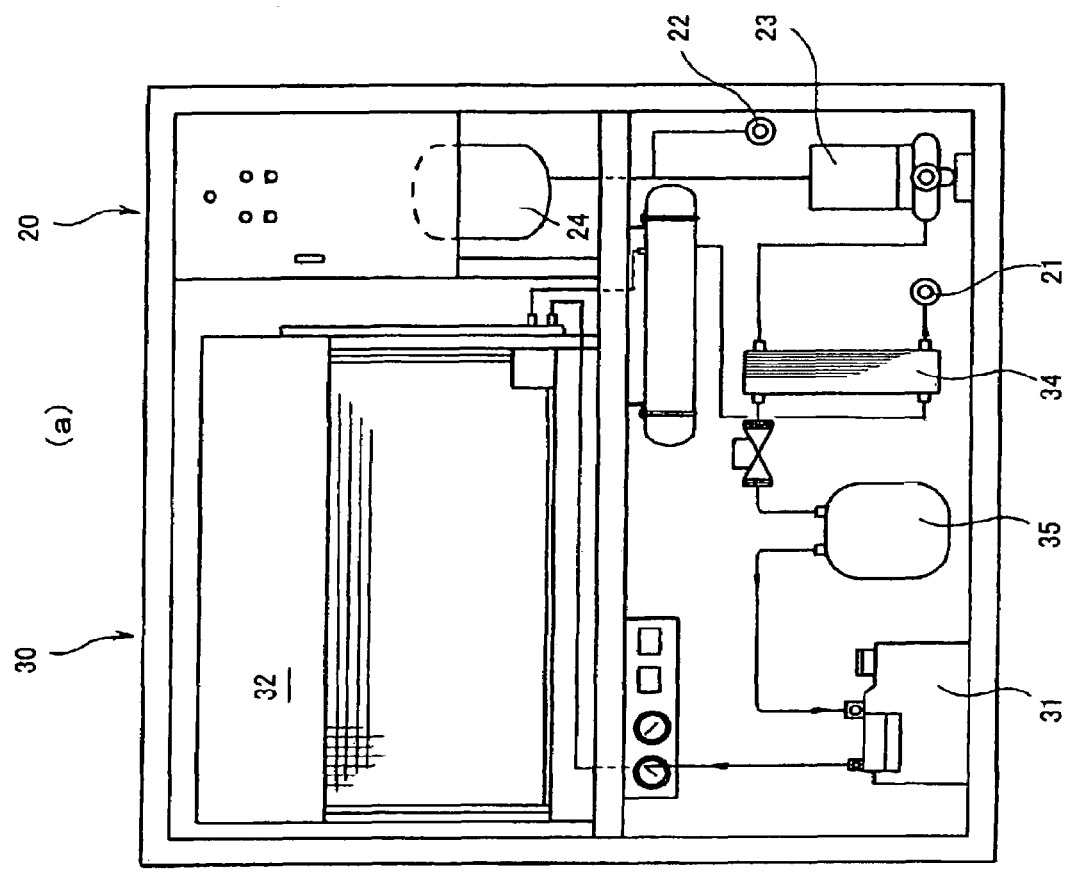
FIG. 4(*a*) is a schematic front view showing the arrangement of the brine supply means 20 and the refrigerator 30 of the cooling tank 1, and FIG. 4(*b*) is a side view of the same.
Figure 4:
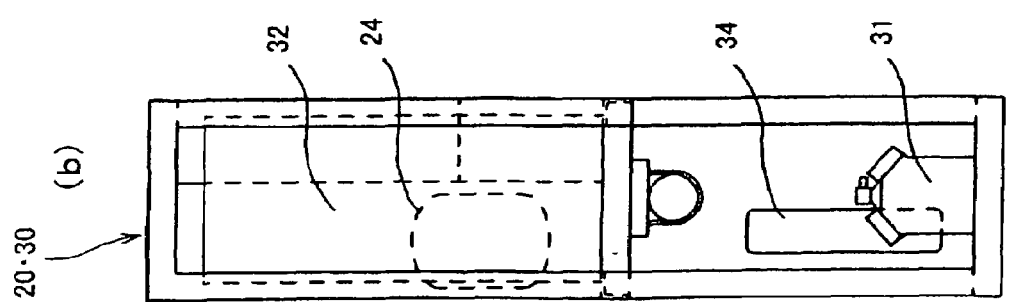
Figure 5:
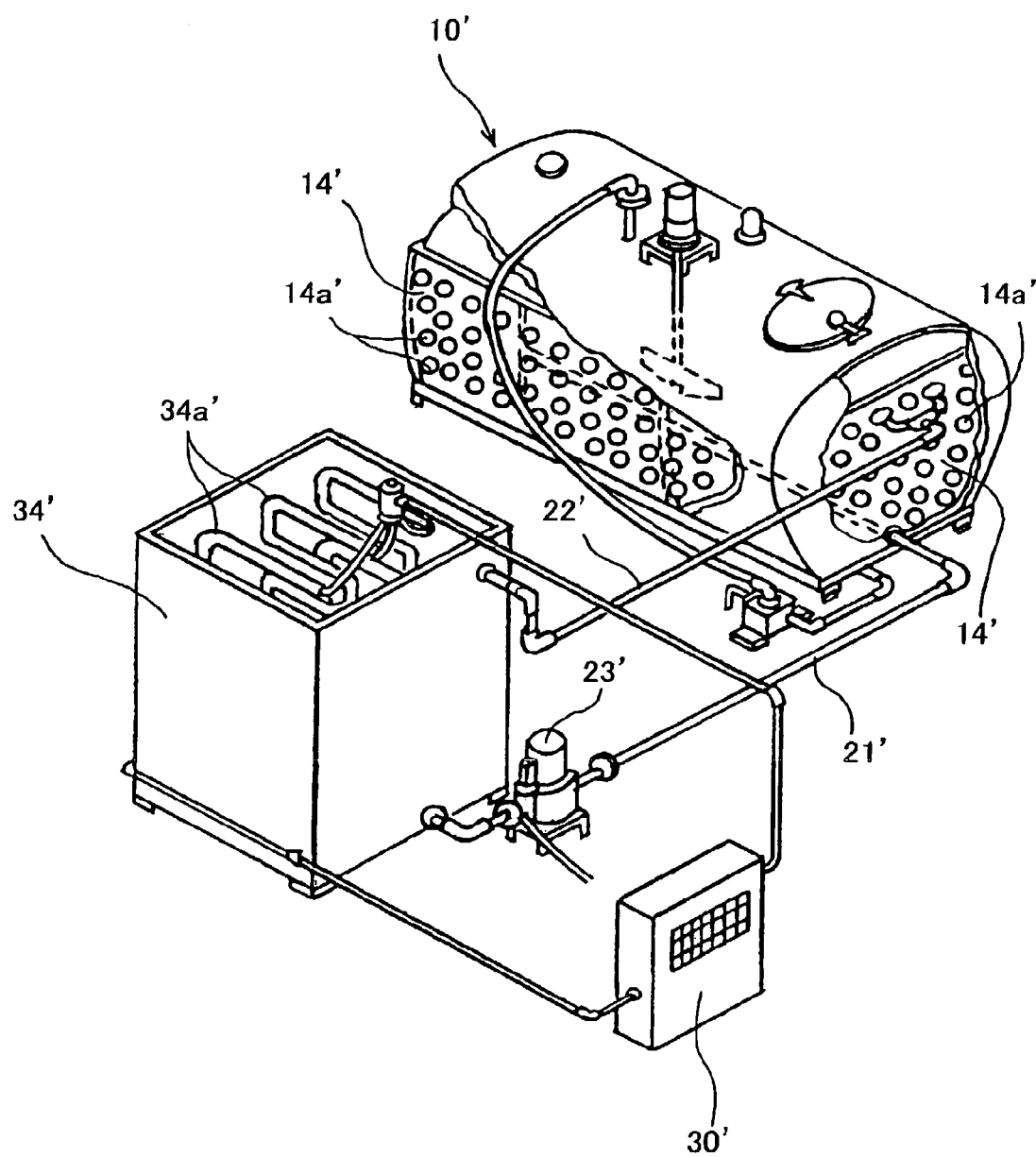
FIG. 5 is a perspective diagram showing the whole structure of the conventional milk tank with a cooling function.

Each flow guide member 14 has the composition therein as shown in FIG. 3(b). The flow guide member 18 also has the same composition. That is, a quadrangle, stainless steel curved surface board 14a has a frame board 14b which is tightly welded in a sealed manner at the whole circumference and a plurality of partition plates 14c which is attached by welding to the inside (concave side) of the curved surface board 14a. By properly setting the length of the partition plates 14c and the connecting relation between each partition plate 14c and the frame board 14b, a continuous space 14d from one of the corners to the other corner of the guide member 14 is formed. The continuous space 14d is formed like a channel having a curved surface board 14a at the bottom and partition plates 14c (or the frame board 14b) at the side. The depth of the channel is about 22 mm which is equal to the width of the frame board 14b and the partition plate 14c, and the width of the channel is about 31 mm which is equal to the interval of partition plates 14c. In each corner of the continuous space 14d, a triangular prism 14e is fixed at the outside in the corner so as to pass the brine smoothly. At the corner part of the flow guide member 14 (the upper right portion in FIG. 3), which is one end of the continuous space 14d, an inlet 14j is provided and an outlet 14k is formed at another corner (the lower left portion in FIG. 3), which is another end of the continuous space 14d.

These flow guide members 14, 18 are provided along with and attached to the external surface of the wall 11a of the tank body 10 (inside the insulating material 11c) as shown in FIG. 3(a). With the curved surface board 14a outside, the frame board 14b and the partition plates 14c are attached to the wall 11a and the whole circumference of the frame board 14b is welded to the wall 11a. Thus, the continuous space 14d in each guide member 14, 18 defines a fluid passage for the brine with a section of about 22 mm×31 mm between the wall 11a and itself, which leads from the inlet 14j to the outlet 14k.

There are several reinforcement ribs 11b circularly welded to the external surface of the tank body 10 (the wall 11a) as shown in FIG. 2, and attachment of the flow guide members 14, 18 to the wall 11a is performed avoiding each rib 11b. Each guide member 14, 18 is not large enough to cover the whole external surface of the tank body 10 by one piece but a sort of block for covering arbitrary small area, so it is easy to put the guide member 14, 18 on the wall 11a avoiding the ribs 11b. With installed avoiding the ribs 11b, the guide member 14, 18 may have a simple structure, and attachment to the wall 11a can be easy.

After attachment of total of 12 flow guide members 14, 18 to the tank body 10 as shown in FIG. 1, they are connected to each other by a pipe 15 and the like and some of the guide members 14, 18 are further connected to a brine feed pipe 21 and a return pipe 22 by branch pipes 13, 17, 16 and 19. That is, the brine sent through the feed pipe 21 is divided by the branch pipe 13 and sent to some guide members 14, and then flows continuously to other guide members 14 through the pipe 15, and finally returns to the pipe 22 through the branch pipe 16. The symbol 16a in FIG. 1 is an air extraction valve. At the same time, the brine is sent from the feed pipe 21 to the branch pipe 17 and into some guide members 18 at the lower side, then flows continuously down to other guide members 18 through a pipe (not illustrated) for connecting the guide members 18, finally, returns to the pipe 22 through the branch pipe 19. Supply of the brine from one guide member 14 to the other guide member 14 or from one guide member 18 to the other guide member 18 is done by using the pipe 15 or the like which connects adjacent two guide members (at the outlet 14k and inlet 14j for example) together in series. As described above, since many guide members are connected in series by piping, as long as sufficient pressure is given to the brine, the brine is sure to run from the upstream guide member 14, 18 to the downstream guide member 14, 18 one by one. Consequently, the wall 11a of the tank body 10 is cooled effectively. As the section of the fluid passage consisting of the continuous space 14d in FIG. 3 is small as mentioned above, the comparatively small amount of the brine flow per hour is sufficient.

INDUSTRIAL APPLICABILITY

The cooling tank according to the present invention is widely available as a tank which stores, and cools not only milk but drinks with preservation temperature around 0.degree. C.

What is claimed is:

1. A cooling tank for storing and cooling a liquid wherein brine with a freezing point below 0° C. is cooled in a cooling unit and allowed to pass through a fluid passage formed on the wall of the tank body preventing the brine from stagnating, and the cooling unit, the tank body and means for passing the brine are assembled integrally within a frame which enables to handle them as one unit when loading, unloading, mounting and transporting, wherein said means for passing the brine has an expansion tank enclosing a gas and consists of sealed type piping system with no air opening.

2. The cooling tank of claim 1, further comprising a flow guide member which includes a sheetlike plate provided along with the wall of the tank body and tightly welded to said wall at its circumference and partition plates which forms a channel-like continuous space disposed in series between said plate and said wall, the flow guide member being installed so that there is no component and air layer other than said wall or said sheetlike plate between said liquid and said continuous space, wherein the brine with a freezing point below 0° C. is cooled in the cooling unit and allowed to pass through said continuous space in the flow guide member which serves as a fluid passage.

3. The cooling tank of claim 1, wherein a plurality of said flow guide members is installed on the external surface of the wall of the tank body avoiding positions of reinforcement ribs and two or more flow guide members are connected together by a pipe.

4. The cooling tank of claim 3, wherein the wall of the tank body is made of stainless metal plate, the external surface of said wall of the tank body and the external surface of said flow guide member are covered with thermal insulation material, and the external surface of said thermal insulation material is covered with protection material.

5. The cooling tank of claim 1, wherein the wall of the tank body is made of stainless metal plate, the external surface of said wall of the tank body and the external surface of said flow guide member are covered with thermal insulation material, and the external surface of said thermal insulation material is covered with protection material.

* * * * *